United States Patent
Nakanishi et al.

(10) Patent No.: US 7,782,487 B2
(45) Date of Patent: Aug. 24, 2010

(54) IMAGE PROCESSING APPARATUS, IMAGE FORMING APPARATUS, IMAGE PROCESSING METHOD, COMPUTER DATA SIGNAL, AND RECORDING MEDIUM

(75) Inventors: Shingo Nakanishi, Kanagawa (JP); Hiroyuki Oyabu, Kanagawa (JP); Shunji Tsunashima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 685 days.

(21) Appl. No.: 11/723,331

(22) Filed: Mar. 19, 2007

(65) Prior Publication Data
US 2008/0068670 A1    Mar. 20, 2008

(30) Foreign Application Priority Data
Sep. 15, 2006    (JP) .............................. 2006-251672

(51) Int. Cl.
*H04N 1/60* (2006.01)
*H04N 1/46* (2006.01)
*G06F 3/12* (2006.01)
*G06K 15/00* (2006.01)
*G06K 9/34* (2006.01)
*G03F 3/08* (2006.01)

(52) U.S. Cl. .................. 358/1.9; 358/2.1; 358/518; 358/523; 358/538; 358/540; 358/1.13; 382/164; 382/165; 382/173; 382/176

(58) Field of Classification Search ................. 358/540, 358/1.9, 1.13, 2.1, 518, 523, 538; 382/162, 382/167, 174, 164, 165, 173, 176; 345/592, 345/629, 545
See application file for complete search history.

(56) References Cited

U.S. PATENT DOCUMENTS

| 7,554,554 B2 * | 6/2009 | Nishi .......................... 345/592 |
| 2006/0279758 A1 * | 12/2006 | Myoki ........................ 358/1.13 |
| 2009/0028424 A1 * | 1/2009 | Sato et al. ................... 382/162 |

FOREIGN PATENT DOCUMENTS

| JP | A 2001-189841 | 7/2001 |
| JP | A 2002-312141 | 10/2002 |
| JP | A 2004-243568 | 9/2004 |

* cited by examiner

*Primary Examiner*—Charlotte M Baker
(74) *Attorney, Agent, or Firm*—Oliff & Berridge, PLC

(57) ABSTRACT

An image processing apparatus includes: an accepting unit that accepts image information about each of a plurality of image elements to be synthesized; a comparing unit that compares a threshold value with a mixing ratio used in an operation to synthesize the image information according to a given mixing ratio; and a setting unit that sets an attribute of an image element in an area where the plurality of image elements are overlapped with each other synthesized according to a comparison result obtained by the comparing unit.

12 Claims, 8 Drawing Sheets

| IMAGES TO BE SYNTHESIS PROCESSED (IMAGE ELEMENTS) | TAG DATA | | THRESHOLD VALUE |
|---|---|---|---|
| | ATTRIBUTES OF IMAGE ELEMENTS | ALPHA VALUE | |
| A | PHOTOGRAPH | 1.0 | 0.8 |
| B | GRAPHIC | 0.5 | 0.7 |
| C | CHARACTER | 0.5 | 0.3 |

FIG. 8

| ATTRIBUTE OF IMAGE ELEMENT OF SOURCE | ATTRIBUTE OF IMAGE ELEMENT OF DESTINATION | THRESHOLD VALUE |
|---|---|---|
| PHOTOGRAPH | GRAPHIC | 0.4 |
| PHOTOGRAPH | CHARACTER | 0.3 |
| GRAPHIC | PHOTOGRAPH | 0.7 |
| GRAPHIC | CHARACTER | 0.8 |
| CHARACTER | PHOTOGRAPH | 0.3 |
| CHARACTER | GRAPHIC | 0.2 |

IMAGE PROCESSING APPARATUS, IMAGE FORMING APPARATUS, IMAGE PROCESSING METHOD, COMPUTER DATA SIGNAL, AND RECORDING MEDIUM

CROSS-REFERENCE TO RELATED APPLICATION

This application is based on and claims priority under 35 USC 119 from Japanese Patent Application No. 2006-251672 filed Sep. 15, 2006.

BACKGROUND

1. Technical Field

The present invention relates to an image processing apparatus, an image forming apparatus, an image processing method, a computer data signal, and a recording medium storing a program for controlling an image processing apparatus.

2. Related Art

Conventionally, in an image forming apparatus such as a printer, there is known a technology for forming and displaying images obtained by synthesizing two or more images in various manners. For example, this technology is used in a case where a new image is synthesized in a partial area of a background image, or in a case where a character, a sign or the like is overlapped with an ordinary image. In such case, in an area where such synthesis or overlapping is carried out, there is executed an image processing which synthesizes an image according to a given mixing ratio and displays such synthesized image. Such image processing is generally referred to as an alpha blend processing.

SUMMARY

According to an aspect of the invention, there is provided an image processing apparatus, including: an accepting unit that accepts image information about each of a plurality of image elements to be synthesized; a comparing unit that compares a threshold value with a mixing ratio used in an operation to synthesize an image information according to a given mixing ratio; and a setting unit that sets an attribute of an image element in an area where the plurality of image elements are overlapped with each other synthesized according to a comparison result obtained by the comparing unit.

BRIEF DESCRIPTION OF THE DRAWINGS

Exemplary embodiments of the present invention will be described in detail based on the following figures, wherein:

FIG. 8 illustrates a table to show an exemplary example of threshold values based on the combinations of the attributes of the image elements of a source and a destination.

DETAILED DESCRIPTION (Detailed Description of Image Forming Apparatus)

Now, description will be given below in detail of a mode for enforcing the invention (which is hereinafter referred to as an embodiment) with reference to the accompanying drawings.

Figure 1:
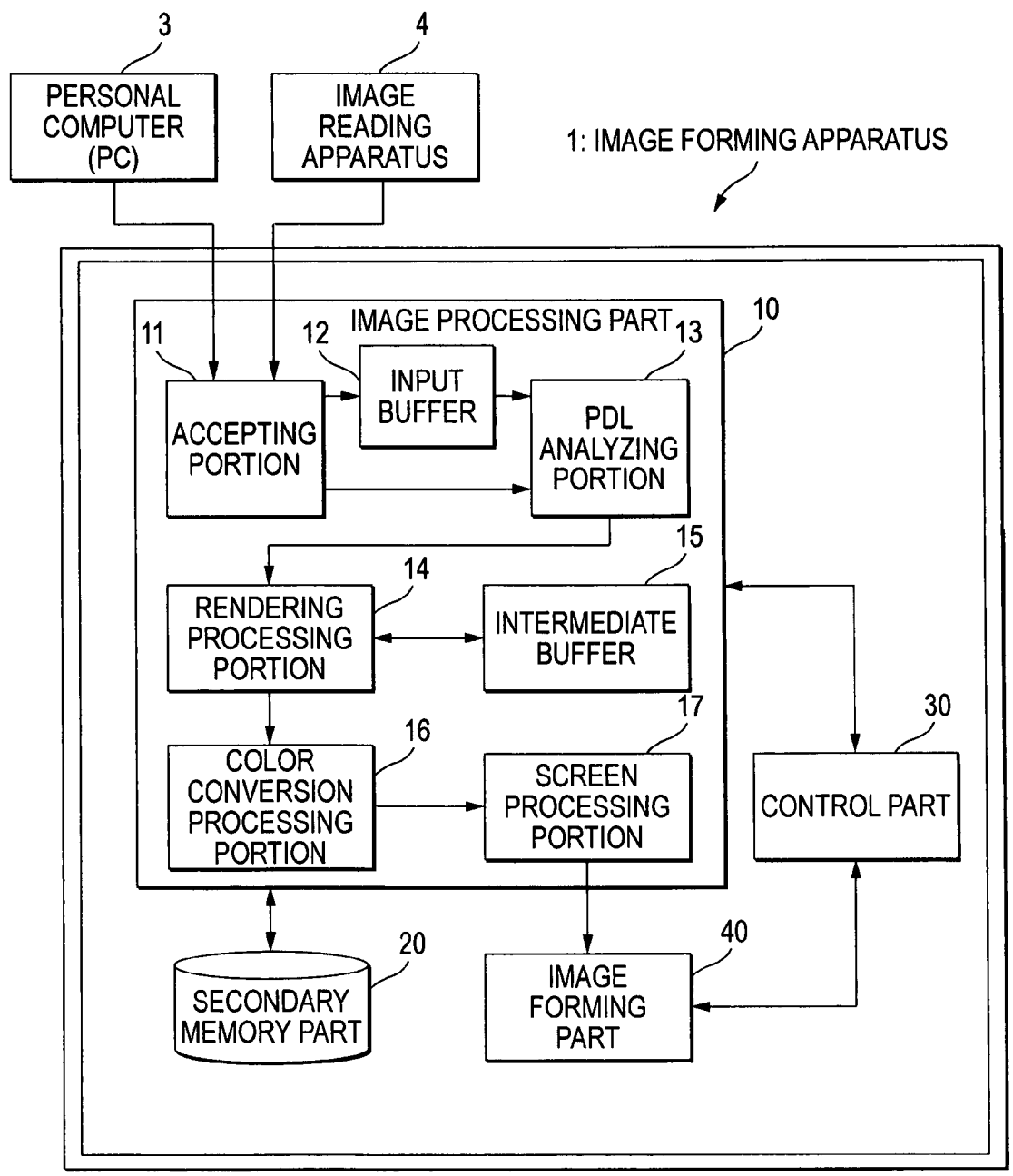
FIG. 1 illustrates a block diagram of an exemplary example of the structure of an image forming apparatus including an image processing apparatus according to an aspect of the invention.

FIG. 1 is a block diagram of an exemplary example of the structure of an image forming apparatus incorporating therein an image processing apparatus to which the present embodiment of the invention is applied. An image forming apparatus 1 shown in FIG. 1 is, for example, a digital color printer which includes, as an image processing unit, an image processing part (an image processing apparatus) 10 for enforcing a given image processing on image information inputted therein from external equipment. And, the image forming apparatus 1 also includes a secondary memory part 20 which can be realized by, for example, a hard disk (Hard Disk Drive) for recording a processing program and the like therein, and a control part 30 for controlling the operation of the whole of the image forming apparatus 1. Also, the image forming apparatus 1 further includes an image forming part 40 which forms an image corresponds to image information about the respective color components. In the image forming part 40, there can be used an image forming method such as an electrophotographic method and an ink jet method.

Next, the image processing part 10 includes an accepting portion 11 functioning as an image information accepting unit that accepts image information from external equipment, for example, a personal computer (PC) 3 and an image read apparatus 4 such as a scanner. And, the image processing part 10 also includes an input buffer 12 for temporarily storing the image information accepted by the accepting portion 11, and a PDL analyzing portion 13 for analyzing image information of a PDL (Page Description Language) format. Also, the image processing part 10 further includes a rendering processing portion 14 for developing (rendering) the image information analyzed in the PDL analyzing portion 13 into raster image information. Here, the raster image information means image information which is expressed in an array of pixels for printing.

Further, the image processing part 10 still further includes an intermediate buffer 15 which is used as an operation area in the rendering processing to be executed by the rendering processing portion 14, and a color conversion processing portion 16 for color converting the raster information into image information of a color specification system (YMCK) suitable for a print processing. And, the image processing part 10 yet further includes a screen processing portion 17 for enforcing a screen processing on the thus color converted raster image information. Here, YMCK means a process color which is composed of Y (Yellow), M (Magenta), C (Cyan) and K (black).

The accepting portion 11 accepts image information and plotting commands from, for example, the personal computer (PC) 3 of a user and the image reading apparatus 4 such as a scanner.

And, the accepting portion 11 outputs the image information to the input buffer 12 and also outputs the plotting commands to the PDL analyzing portion 13. Here, this image information contains pixel data and tag data. Specifically, the pixel data are data belonging to, for example, an sRGB color space which is expressed as a gradation of 8 bits (1 byte) for every RGB. Also, the tag data are the data that contain information (character, graphic, photograph and the like) about, for example, the attributes of image elements. Here, RGB means the three primary colors of the light which are composed of R (Red), G (Green) and B (Blue).

The input buffer 12 temporarily holds the image information inputted from the accepting portion 11 and outputs it to the PDL analyzing portion 13. The PDL analyzing portion 13, based on the analyzed results of the image information obtained from the input buffer 12 according to the plotting command, creates image information corresponding to, for example, a print of one page. And, the PDL analyzing portion 13 outputs the thus created image information to the rendering processing portion 14.

The rendering processing portion 14 enforces a rendering processing on the image information obtained from the PDL analyzing portion 13 according to the plotting command. In the rendering processing, the rendering processing portion 14 enforces a processing on the image information to be synthesized (about a source and a destination) to synthesize the images according to a given mixing ratio, that is, an alpha blend processing.

Referring here to the term "source", when an alpha blend processing is executed, the source means an image on the synthesizing side in the image forming operation, that is, an image to be an upper layer. Also, the term "destination", when the alpha blend processing is executed, means an image on the synthesized side in the image forming operation, that is, an image to be a lower layer.

And, the alpha blend processing means a processing which semi-transparent synthesizing images using a given mixing ratio, that is, using an alpha value in an area where the source and destination are overlapped on top of each other. Also, the alpha value is a value used in an operation for execution of the alpha blend processing and expresses the degree of transparency of an image; and, the alpha value is the value that is owned by a pixel individually. Specifically, the alpha value=0 expresses that the image is perfectly transparent, whereas the alpha value=1 expresses that the image is not transparent at all. Also, when an alpha value is multiplied by a pixel value there is provided the density of an image (image element). By the way, the pixel value expresses the luminance of the respective colors of pixel data that belong to the sRGB space.

The rendering processing portion 14, based on such alpha blend processing, creates not only pixel data containing the pixel values of every RGB of the synthetic image but also tag data containing the alpha value of the synthetic image.

Also, the rendering processing portion 1.4, in this rendering processing, when alpha blending the source and destination, recognizes the alpha value and the attribute of the image element contained in the image information of the source. Further, the rendering processing portion 14 reads out a threshold value corresponding to the attribute of the image element of the source from the secondary memory part 20. And, the rendering processing portion 14 compares the recognized alpha value with the thus read-out threshold value. Then, the rendering processing portion 14 sets the attribute of the image element in an area where the image elements alpha blended based on the comparison result are overlapped with each other, and adds the attribute of such image element to the tag data. Thus, the rendering processing portion 14 has not only a function serving as a comparing unit (a comparing portion) that compares the alpha value with the threshold value but also a function serving as a setting unit (a setting portion) that sets the attribute of the image element. Also, the secondary memory part 20, as described above, has a function serving as a storing unit (a storing portion) that stores the threshold value.

Thus, the rendering processing portion 14 generates tag data expressed in 8 bits (1 byte) which are composed of, for example, the attribute of the image element and alpha value. And, the rendering processing portion 14 outputs raster image information composed of the thus rendering processed pixel data and tag data to the color conversion processing portion 16.

The color conversion processing portion 16 color converts the accepted raster image information to the image information (YMCK) of a color specification system which is suitable for a printing processing in the image forming part 40 and outputs the thus-processed image information to the screen processing portion 17. Here, the color conversion processing portion 16 executes the color conversion processing using color conversion coefficients which differ in every attributes of the image elements. By the way, these two or more color conversion coefficients are, for example, two or more conversion table data of a table look-up system and are stored in, for example, the secondary memory part 20. Thus, the color conversion processing portion 16 can recognize the attribute of the image element based on the tag data contained in the raster image information supplied from the rendering processing portion 14, and can enforce an optimum color conversion processing corresponding to the attribute of the image element.

The screen processing portion 17 enforces a screen processing on the raster image information of multiple values (each in 8 bits) for the respective color components (YMCK) inputted from the color conversion processing portion 16. As a result of this, the screen processing portion 17, based on the raster image information which is multi-value image information having density gradations, generates binarized image information (image information in a 1 bit) which expresses the density of a medium contrast image in a pseudo manner according to the size of a colored dot called a dot.

The screen processing portion 17 not only can recognize the attribute of the image element based on the tag data contained in the raster image information supplied from the rendering processing portion 14 but also can enforce an optimum screen processing on the respective images using screen parameters respectively set for the respective attributes of the image elements. By the way, the screen parameters are parameters which are used to create a screen; and thus, the screen parameters are used to control a screen pattern, a screen line width, a screen pitch, a screen angle and the like. And, the screen parameters are held in, for example, in the secondary memory part 20 for the respective attributes of the image elements.

And, the screen processing portion 17 outputs the thus generated binary image information to a laser exposure device (not shown) included in the image forming part 40.

(Detailed Description of Image Processing Apparatus)

Figure 2:
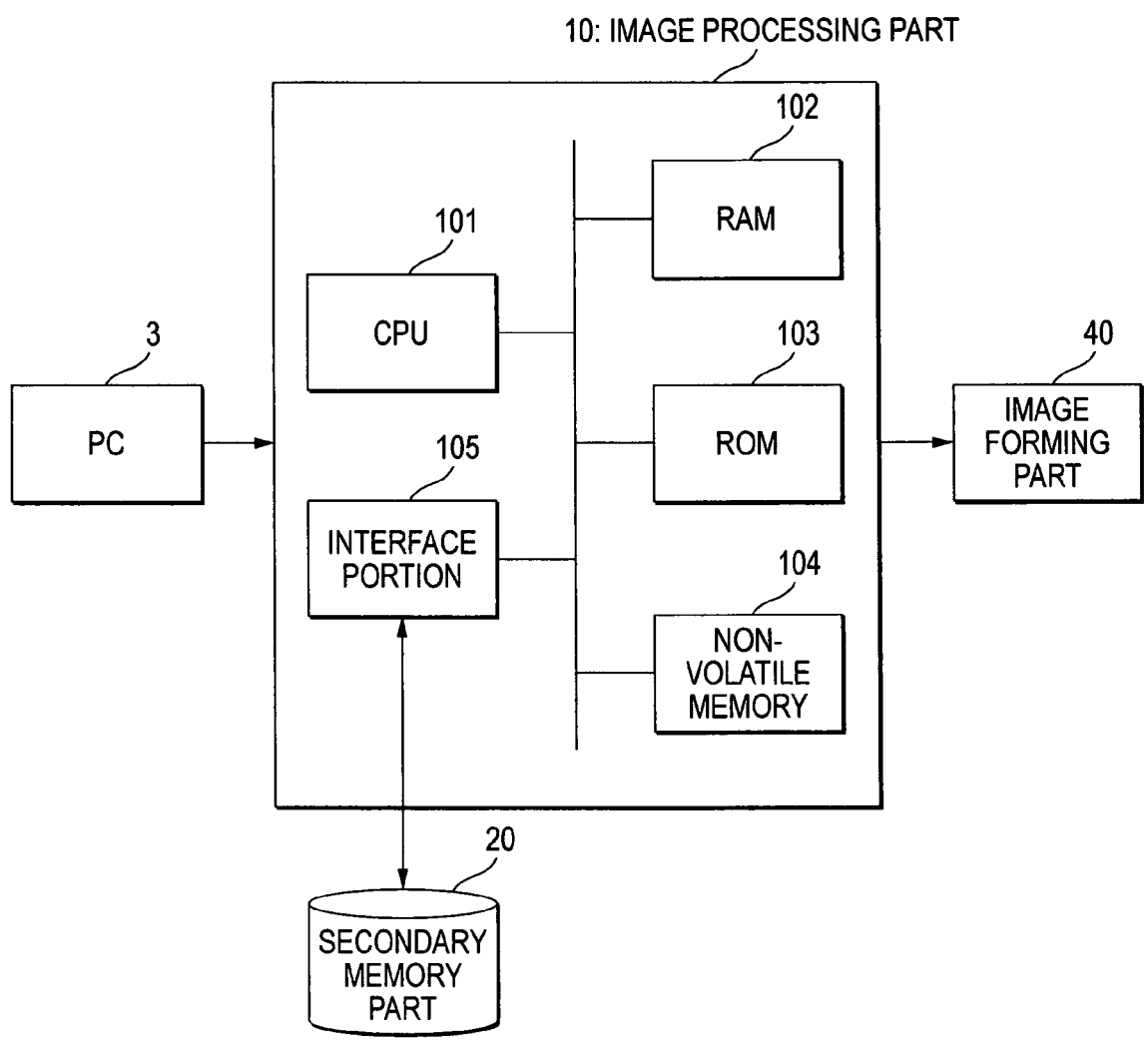
FIG. 2 illustrates a block diagram of the internal structure of an image processing part.

Now, FIG. 2 is a block diagram of an exemplary example of the internal structure of the image processing part 10 according to the present embodiment. As shown in FIG. 2, the image processing part 10 includes a CPU 101 which, when processing the image information, executes a digital operation processing according to a previously set processing program. The CPU 101 includes a RAM 102 to be used as the operation memory unit of the CPU 101, and a ROM 103 for storing a processing program and the like to be executed by the CPU 101. When the image forming apparatus 1 is started, if the CPU 101 reads in the processing program, the image processing in the image processing part 10 according to the present embodiment can be carried out. Also, the image processing part 10 further includes a non-volatile memory 104 such as an SRAM or a flash memory which is backed up by a battery and also which can rewrite the data and, even when the power supply is cut off, can hold the data. Further, the image processing part 10 still further includes an interface portion 105 which controls the output and input of signals to and from the respective parts of the image processing apparatus 1 such as the PC 3, secondary memory part 20 and image forming part 40 respectively connected to the image processing part 10. Also, in the secondary memory part 20 (see FIG. 1), there are held, for example, the threshold values, color conversion coefficients and screen parameters.

(Description of Tag Data of Image to be Synthesized)

Figures 3A, 3B:
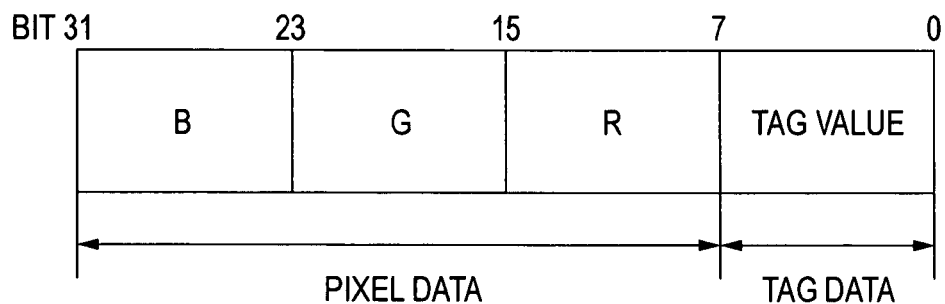
FIG. 3A illustrates a table to show an exemplary example of the tag data of images to be synthesis processed and an exemplary example of threshold values related to the respective attributes of image elements.
FIG. 3B illustrates an exemplary example of the data structure of image information.

FIG. 3A is a view to show an exemplary example of the relationship between the tag data (the attributes and alpha values of the image elements) on the respective images to be synthesized and threshold values. And, FIG. 3B is also a view to show an exemplary example of the data structure of the image information to be outputted from the PDL analyzing portion 13 (see FIG. 1).

Specifically, FIG. 3A shows the tag data (the attributes and alpha values of the image elements) on the respective images to be synthesized and threshold values, and shows the relationship between the attributes of the image elements and threshold values. In the exemplary example shown in FIG. 3A, images to be synthesized according to the alpha blend processing are three images (image elements), that is, A, B and C. And, the attribute of the image element of the image A is "photograph", and the alpha value thereof is "1.0". Also, the attribute of the image element of the image B is "graphic", and the alpha value thereof is "0.5". Further, the attribute of the image element of the image C is "character", and the alpha value thereof is "0.5".

In the exemplary example shown in FIG. 3A, the images to be synthesized are tree images which respectively have the different attributes of the image elements; however, this is just an example. That is, the images to be synthesized may be two images or four or more images. Also, it is also possible to synthesize images having the same attributes of the image elements. For example, in FIG. 3A, the image A and image B may both have the same image element attribute "photograph". And, the alpha values of the respective images are set by the image elements or by the pixels. Therefore, when synthesizing the images having the same image element attribute, the alpha values of the images may be the same or may be different.

And, in the exemplary example shown in FIG. 3A, when the attribute of the image element is "photograph", the threshold value is "0.8". Also, when the attribute of the image element is "graphic", the threshold value is "0.7". Further, when the attribute of the image element is "character", the threshold value is "0.3".

Now, FIG. 3B shows an exemplary example of the data structure of the image information to be outputted from the PDL analyzing portion 13 (see FIG. 1). This image information is, for example, 4-byte data which are composed of not only pixel data belonging to the sRGB color space expressed by 256 gradations (0~255) each in 8 bits (1 byte) for each of the RGB but also tag data in 8 bits (the attributes and alpha values of the image elements).

(Exemplary Embodiment of Rendering Processing)

Next, description will be given below of a processing for overlapping images (image elements) with each other, while this processing belongs to the rendering processing to be executed by the rendering processing portion 14 (see FIG. 1).

Figure 4:
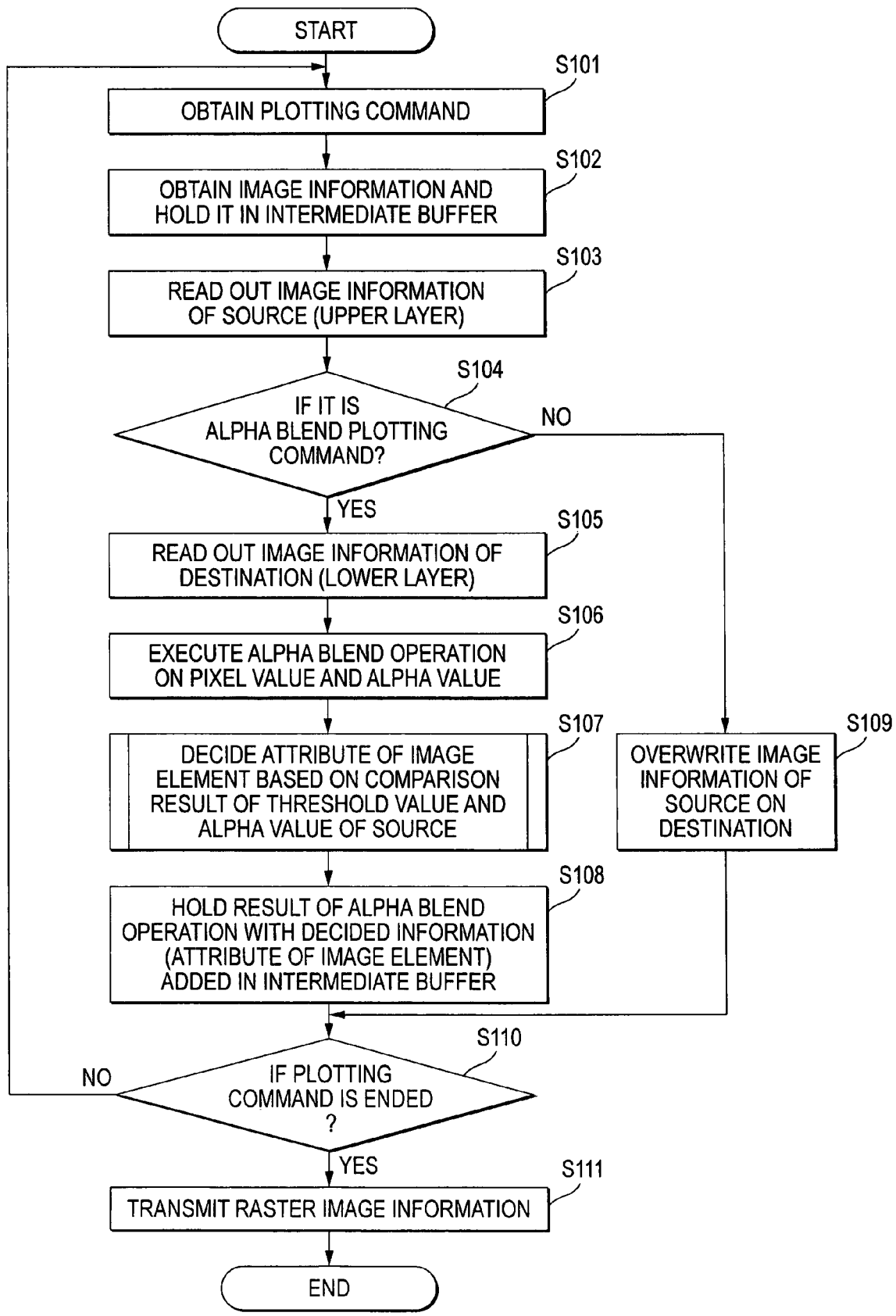
FIG. 4 illustrates a flow chart of an exemplary example of the procedure of a rendering processing to be executed in a rendering processing portion.

Now, FIG. 4 is a flow chart of the procedure of the rendering processing to be executed by the rendering processing portion 14 (see FIG. 1). By the way, the following operation example shows the procedure of the rendering processing where the image A (see FIG. 3A) is a destination and the image C (see FIG. 3A) is a source.

Firstly, the rendering processing portion 14 obtains a plotting command from the PDL analyzing portion 13 (see FIG. 1) (Step S101). Also, the rendering processing portion 14 obtains image information on the image elements of the images A and C generated in the PDL analyzing portion 13, and holds the image information in the intermediate buffer 15 (see FIG. 1) (Step S102). Next, the rendering processing portion 14, based on the plotting command, reads out the image information about the image C (source) from the intermediate buffer 15 (Step S103). Then, the rendering processing portion 14 checks whether the plotting command is an alpha blend plotting command or an overwrite plotting command (Step S104).

In Step S104, when it is judged that the plotting command is the alpha blend plotting command, the rendering processing portion 14 reads out the image information about the image A (destination) from the intermediate butter 15 according to the plotting command (Step S105).

And, the rendering processing portion 14 enforces an alpha blend processing on the image information on the destination and source (Step S106). In this alpha blend processing, an alpha blend operation is carried out on the pixel values contained in the pixel data of 8 bits (1 byte) of the respective RGB (see FIG. 3B) and the alpha values contained in the tag data (see FIG. 3B) of 8 bits. The specific contents of this alpha blend operation will be described later.

Next, the rendering processing portion 14 compares or checks whether the alpha value of the source is larger than the threshold value of the source or not, and, based on this comparison, decides the attributes of the image elements existing in an area where the image elements (source and destination) are overlapped with each other (Step S107). By the way, description will be given in detail of the procedure for deciding the attributes of the image elements existing in an area where the image elements (source and destination) are overlapped with each other.

And, the intermediate buffer 15 holds raster image information containing the results obtained from the alpha blend operation in Step S106 with the attributes of the image elements decided in Step S107 added thereto (Step S108). And, it is checked whether all plotting commands are ended or not (Step S110). When it is judged that all plotting commands are ended, the processing goes to Step S111 (which will be described later); when not ended, the processing goes back again to Step S101.

On the other hand, when it is judged in Step S104 that the plotting command is the overwrite plotting command, the rendering processing portion 14 overwrites the image information of the image C on the image information of the image A which is the destination held in the intermediate buffer 15 (Step S109). Specifically, the pixel values, pixel element attributes and alpha values of the respective RGB existing in an area where the lower and upper layer images are overlapped with each other are overwritten into the pixel values, pixel element attributes and alpha values of the respective RGB of the image C. After then, the processing goes to Step S110.

And, the rendering processing portion 14 transmits the raster image information held by the intermediate buffer 15 to the color conversion processing portion 16 (see FIG. 1) (Step S111), thereby ending the processing. By the way, the color conversion processing portion 16, after color conversion of the raster image information, transmits the raster image information to the screen processing portion 17 (see FIG. 1).

The color conversion processing portion 16, in accordance with the attributes of the image elements decided in Step S107 or in Step S109, selects color conversion coefficients which are used in color conversion processings for the respective pixels (YMCK). Also, the screen processing portion 17, in accordance with the attributes of the image elements decided in Step S107 or in Step S109, selects screen parameters which are used in screen processings for the respective pixels (YMCK).

(Exemplary Embodiment for Setting Attribute of Area where Two or More Image Elements are Overlapped with Each Other)

Next, description will be given below of a specific processing to be executed in Step S107 (see FIG. 4).

Figure 5:
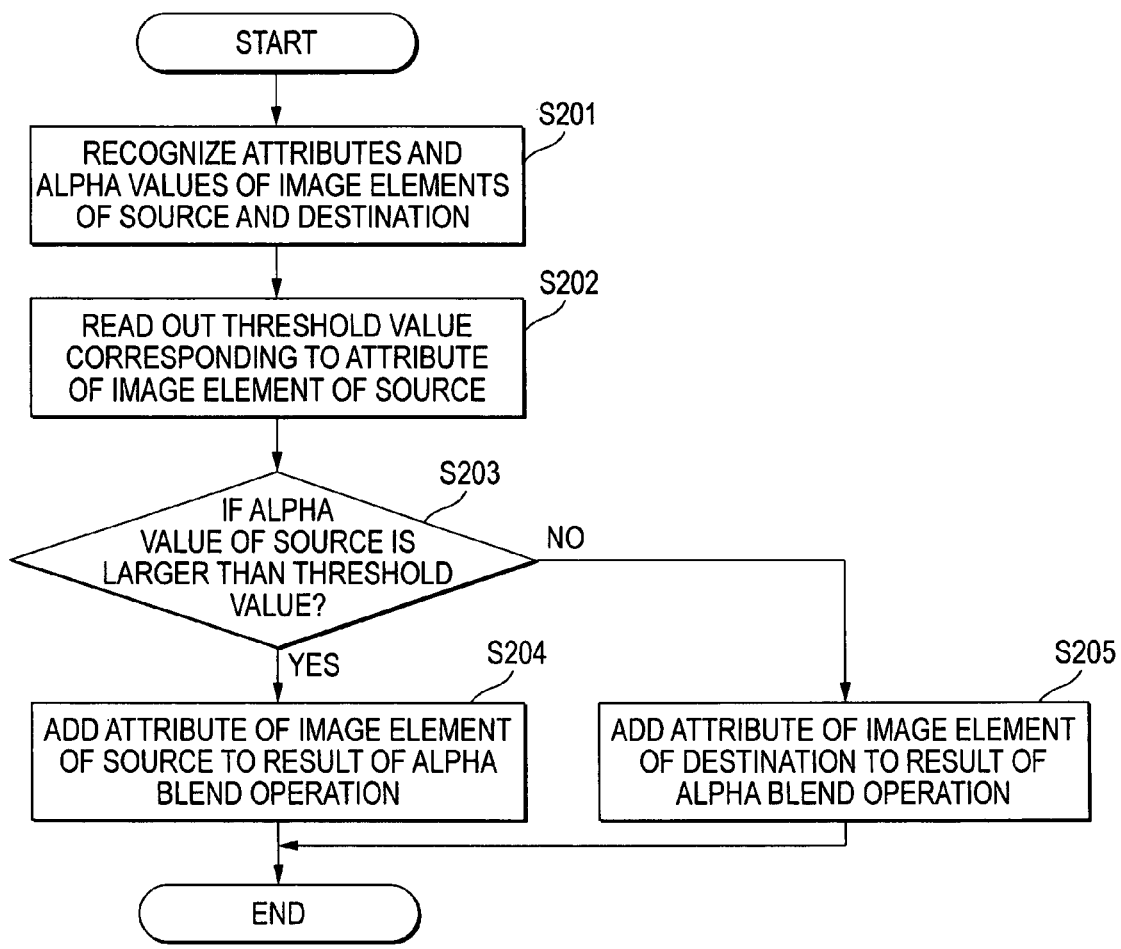
FIG. 5 illustrates a flow chart of an exemplary example of the procedure of a processing for setting the attribute of an area where two or more image elements are overlapped with each other.

Now, FIG. 5 is a flow chart of a portion (Step S107) of the rendering processing to be executed in the rendering processing portion 14 (see FIG. 1). Firstly, the rendering processing portion 14, from the image information on the source and destination read out from the intermediate buffer 15 (see FIG. 1), recognizes the attributes and alpha values of the respective image elements (Step S201).

Next, the rendering processing portion 14 reads out a threshold value (see FIG. 3A) which corresponds to the attribute of the image element of the source (Step S202). This threshold value is held in, for example, the secondary memory part 20. Then, the rendering processing portion 14 checks whether the alpha value contained in the source image information (tag data) read out in Step S103 (see FIG. 4) is larger than the threshold value or not (Step S203).

When it is judged in Step S203 that the alpha value is larger than the threshold value, the rendering processing portion 14 adds the attribute of the source image element to the result of the alpha blend operation obtained in Step S106 (see FIG. 4) (Step S204). Also, when it is judged in Step S203 that the alpha value is smaller than the threshold value, the rendering processing portion 14 adds the attribute of the destination image element to the result of the alpha blend operation obtained in Step S106 (Step S205), thereby ending the processing.

(Example of Setting of Attribute of Image Element to be Applied to Alpha Blend Processed Area)

Next, description will be given below of the attribute of the image element to be applied to an area on which an alpha blend processing has been enforced.

Figure 6:
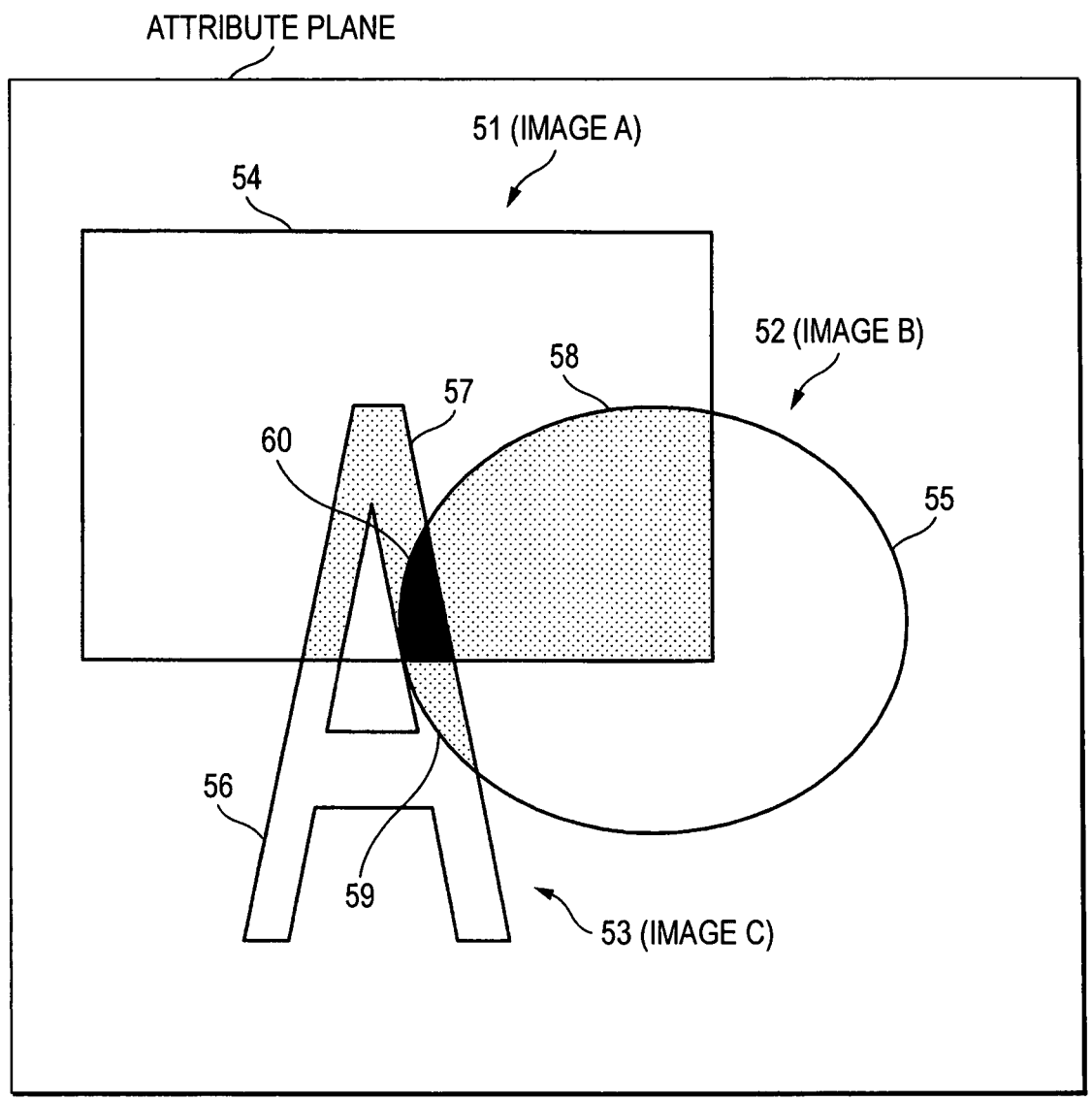
FIG. 6 illustrates an explanatory view of the attribute of image elements set in an area on which an alpha blend processing has been enforced.

Now, FIG. 6 shows an exemplary example of a state where the image processing part (image processing apparatus) 10 sets the attribute of an image element. Here, there is shown a synthesized image in which an image A having a rectangular shape 51, an image B having an elliptical shape 52 and an image C having a character 53 shape are overlapped with each other and synthesized together. By the way, in the exemplary example shown in FIG. 6, the images A, B and C are the images shown in FIG. 3A and they carry the tag data shown in FIG. 3A with them. Therefore, the image A is an image the image element attribute of which is "photograph", the image B is an image the image element attribute of which is "graphic", and the image C is an image the image element attribute of which is "character".

And, an area 54 is an image area only for the image A, an area 55 is an image area only for the image B, and an area 56 is an image area only for the image C. Also, an area 57 is an area where the image elements of the images A and C are overlapped with each other, an area 58 is an area where the image elements of the images A and B are overlapped with each other, and an area 59 is an area where the image elements of the images B and C are overlapped with each other. And, an area 60 is an area where the image elements of the images A, B and C are overlapped with each other. By the way, in the exemplary example shown in FIG. 6, the image A is arranged on the lower-most layer, the image C is arranged on the image A, and the image B is finally arranged on the image C.

Firstly, description will be given below of the attributes of the image elements in the areas 54, 55 and 56. These image areas are areas where image elements are not overlapped with each other. Therefore, in these areas, the alpha blend processing is not enforced but the attribute of the image element of the area 54 is "photograph" (see FIG. 3A). And, the attribute of the image element of the area 55 is "graphic" (see FIG. 3A), and the attribute of the image element of the area 56 is "character" (see FIG. 3A).

Next, description will be given below of the attributes of the image elements in the areas 57, 58 and 59. These areas are areas in which two image elements (images) are overlapped with each other and an alpha blend processing is enforced on the image elements. Thus, the attributes of the image elements in these areas are set by the processing (see FIG. 5) for setting the attributes of the image elements in the rendering processing portion 14 (see FIG. 1).

The area 57 is an area in which the image elements of the images A and C are overlapped with each other. In this area, the image A functions as a destination and the image C functions as a source. Therefore, in Step S103 (see FIG. 4), the rendering processing portion 14 (see FIG. 1) recognizes an alpha value contained in the image information (tag data) of the image C. Also, in Step S202 (see FIG. 5), the rendering processing portion 14 reads out a threshold value corresponding to the attribute of the image element of the image C. Here, from the table shown in FIG. 3A, the alpha value is "0.5" and the threshold value is "0.3". Accordingly, it is judged in Step S203 (see FIG. 5) that the alpha value is larger than the threshold value. And, in Step S204 (see FIG. 5), the attribute of the image element in the area 57 is set for "character" which is the attribute of the image element of the source (image C).

The area 58 is an area in which the image elements of the images A and B are overlapped with each other. In this image area, the image A serves as a destination and the image B serves as a source. Thus, in Step S103 (see FIG. 4), the rendering processing portion 14 recognizes an alpha value contained in the image information (tag data) of the image B. Also, in Step S202, the rendering processing portion 14 reads out a threshold value corresponding to the attribute of the image element of the image B. Here, from the table shown in FIG. 3A, the alpha value is "0.5" and the threshold value is "0.7". Accordingly, it is judged in Step S203 (see FIG. 5) that the alpha value is smaller than the threshold value. And, in Step S205, the attribute of the image element in the area 58 is set for "photograph" which is the attribute of the image element of the destination (image A).

The area 59 is an area in which the image elements of the images B and C are overlapped with each other. In this image area, the image C serves as a destination and the image B serves as a source. Thus, in Step S103 (see FIG. 4), the rendering processing portion 14 recognizes an alpha value contained in the image information (tag data) of the image B. Also, in Step S202, the rendering processing portion 14 reads out a threshold value corresponding to the attribute of the image element of the image B. The processings in Steps 203 and 204 to be executed after then are similar to those in the area 58 and thus the description thereof is omitted here. And, in Step S205, the attribute of the image element in the area 59 is set for "character" which is the attribute of the image element of the destination (the image C).

The area 60 is an area in which the images A, B and C are overlapped with each other. In this image area, the area 57, which has the same image element attribute as the area in which the image elements of the images A and C are overlapped with each other, functions as a destination and the image B functions as a source, because the image B is overlapped last. Therefore, in Step S103 (see FIG. 4), the rendering processing portion 14 recognizes an alpha value contained in the image information (tag data) of the image B. Also, in Step S202, the rendering processing portion 14 reads out a threshold value corresponding to the attribute of the image element of the image B. The processings in Steps 203 and 204 to be executed after then are similar to those in the area 58 and thus the description thereof is omitted here. And, in Step S205, the attribute of the image element in the area 60 is set for the attribute of the image element of the destination. Here, it is set for "character" which is the attribute of the image element of the destination.

(Specific Contents of Alpha Blend Operation)

Next, description will be given below of an alpha blend processing to be enforced on a pixel value and an alpha value contained in the image information about targets (source and destination) used to synthesize an image.

Here, in an area to be alpha blended, as regards the respective color components of every RGB, the pixel value of the source is expressed as S, the pixel value of the destination is expressed as D and the alpha value of the source is expressed as $S\alpha(0 \leq S\alpha \leq 1)$. Thus, according to an alpha blend operation expressed by the following expression (1), for every RGB, there is generated a pixel value D' which has been alpha blend processed.

$$D'=S \times S\alpha + D \times (1-S\alpha) \quad (1)$$

Also, the alpha value of the destination is expressed as $D\alpha(0 \leq D\alpha \leq 1)$. Thus, according to an alpha blend operation expressed by the following expression (2), there is generated an alpha value D'α which has been alpha blend processed.

$$D'\alpha = S\alpha \times D\alpha + D \times (1-S\alpha) \quad (2)$$

Figure 7A:
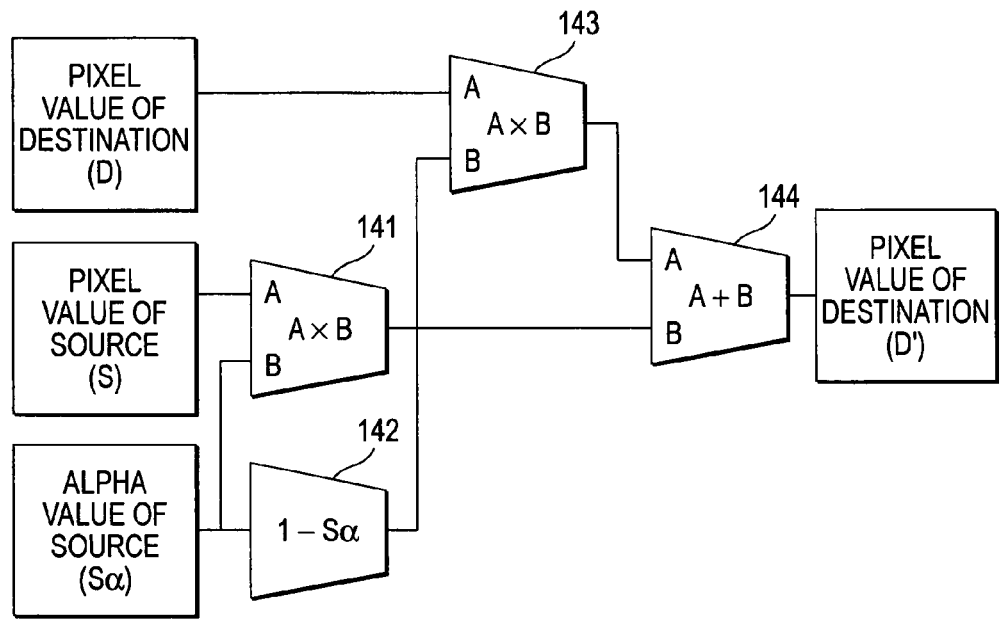
FIGS. 7A and 7B each illustrates a circuit diagram of an exemplary example of an alpha blend arithmetic circuit configured in the rendering processing portion.
Figure 7B:
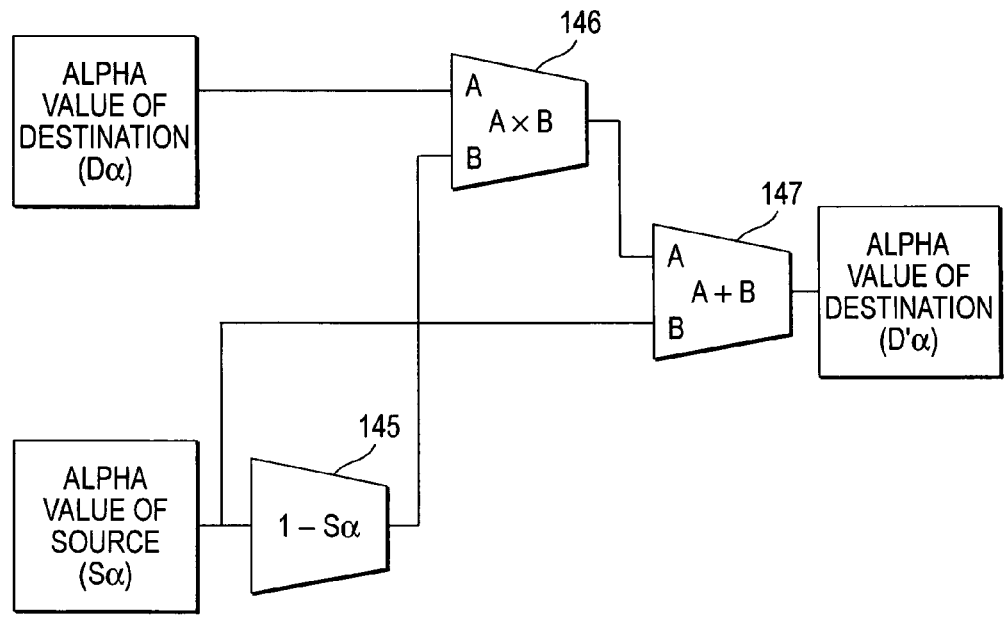

Now, FIGS. 7A and 7B each is a circuit diagram of an exemplary example of an alpha blend operation circuit configured in the rendering processing portion 14.

Specifically, an alpha blend operation circuit shown in FIG. 7A is a circuit for alpha blend processing a pixel value. This circuit includes a multiplier 141, a functional unit 142 which carries out the operation of (1−Sα), a multiplier 143 and an adder 144. The multiplier 141 multiplies the pixel value (S) of the source by the alpha value (Sα) of the source to obtain S×Sα. The multiplier 143 multiplies the pixel value (D) of the destination by (1−Sα) obtained in the functional unit 142, thereby obtaining D×(1−Sα). And, the adder 144 adds the multiplication result in the multiplier 141 to the multiplication result in the multiplier 143 to thereby obtain D'=S×Sα+D×(1−Sα).

Also, an alpha blend operation circuit shown in FIG. 7B is a circuit which is used to enforce an alpha blend processing on the alpha value. This circuit includes a functional unit 145 to carry out the (1−Sα) operation, a multiplier 146 and an adder 147. The multiplier 146 multiplies the alpha value (Dα) of the destination by the (1−Sα) obtained in the functional unit 145, thereby obtaining Dα×(1−Sα). And, the adder 147 adds the alpha value (Sα) of the source to the multiplication result obtained in the multiplier 146, thereby obtaining D'α=Sα+Dα×(1−Sα).

Although description has been given hereinabove of the processing for creating the image in the area in which the image elements are overlapped with each other according to the alpha blend processing, the above-mentioned cases are just an example.

For example, in the above-mentioned description, the setting of the attribute of the area in which two or more image elements are overlapped with each other is carried out based on the comparison of a threshold value corresponding to the attribute of the image element of the source with the alpha value of the source. However, this is not limitative. Specifically, when two images are synthesized together, there may also be used a threshold value corresponding to the attribute of the image element of the destination and the alpha value of the destination. Further, these values, a threshold value corresponding to the attribute of the image element of the source, and the alpha value of the source may also be used to set the attribute of an area where two or more image elements are overlapped with each other.

Still further, in the above-mentioned embodiment, when synthesizing three or more images together, every two images are sequentially overlapped with each other, and the attributes of areas where they are overlapped with each other are decided (see the areas 57 and 60 respectively shown in FIG. 6). However, such setting of the attributes may also be carried out using not only a threshold value corresponding to the attribute of the image element of a specific one of the three or more images to be overlapped but also the alpha value of the specific image. In this case, for example, there may also be used the threshold value and alpha value of the image having the attribute of the image element the threshold value of which is set smallest. Also, there may also be used the threshold value and alpha value of the image that has the highest alpha value.

Also, a threshold value may be decided based on the combination of the attributes of the image elements of the source and destination and, based on the comparison of the thus decided threshold value and the alpha value of the source, the attribute of an area where two or more image elements are overlapped with each other may be decided. Now, FIG. 8 shows an exemplary example of threshold values based on the combinations of the attributes of the image elements of the source and destination.

In the exemplary example shown in FIG. 8, when the combinations of the attributes of the image elements of the source and destination are "photograph and "graphic", the threshold value is "0.4"; and, for "photograph and character", the threshold value is "0.3". And, in the exemplary example shown in FIG. 8, when the combinations of the attributes of the image elements of the source and destination are "graphic and photograph", the threshold value is "0.7"; and, for "graphic and character", the threshold value is "0.8". Also, in the exemplary example shown in FIG. 8, when the combinations of the attributes of the image elements of the source and destination are "character and photograph", the threshold value is "0.3"; and, for "character and graphic", the threshold value is "0.2".

And, based on the contents of the exemplary example shown in FIG. 8, description will be given below of a specific example for setting the attribute of an area in which two or more image elements are overlapped with each other. Here, as a representative example, description will be given of a case in which the attribute of the image element of the source is "photograph" and the alpha value thereof is "0.35". In this case, when the attribute of the image element of the destination is "graphic", the threshold value is "0.4", and the alpha value of the source is smaller than the threshold value; and, therefore, the attribute of an area in which two or more image elements are overlapped with each other is set for "graphic". And, when the attribute of the image element of the destination is "character", the threshold value is "0.3" and the alpha value of the source is larger than the threshold value; and, therefore, the attribute of an area in which two or more image elements are overlapped with each other is set for "photograph". That is, even when the attributes of the image elements of the source are the same, depending on the attribute of the image element of the destination to be synthesized, the attribute of the image element of the source or destination may be set with respect to the area where the image elements are overlapped with each other.

Also when the attribute of the image element of the source is "graphic" or "character", in a similar method to the above, the attribute of an area in which two or more image elements are overlapped with each other can be set for the attribute of the image element of the source or destination.

And, in the above description, the present embodiment is enforced in the sRGB color space but this is not limitative. For example, the invention may also be enforced in a YMC color space. In this case, for example, in the accepting portion 11 (see FIG. 1), there is executed a color conversion processing for every pixels (YMCK) using a color conversion coefficient which is not selected according to the color space of the image element; after then, in the rendering processing portion 14 (see FIG. 1), there is set the attribute of the image element; and, based on the thus set attribute, in the color conversion processing portion (see FIG. 1), there is carried out a color correction processing.

Also, in FIG. 3A, the threshold value is held in the secondary memory part 20 (see FIG. 1) but the invention is not limited to this. For example, the threshold value may also be set forth in the tag data. In this case, the PDL analyzing portion 13 reads out a threshold value stored in, for example, the secondary memory part 20 (see FIG. 1) and adds the read-out threshold value to the tag data. And, in Step S202 (see FIG. 5), the rendering processing portion 14 recognizes the threshold value from the tag data of the source. Also, a threshold value setting portion for setting threshold values for every attributes of the image elements may also be provided in the image processing part (image processing apparatus) 10 (see FIG. 1). And, a printer driver held in the PC 3 (see FIG. 1) may also have a function to set this threshold value.

Further, the arithmetic circuit for executing an alpha blend operation is not limited to one shown in FIGS. 7A and 7B but there may also be used any type of arithmetic circuit, provided that it can obtain the expressions (1) and (2) as a result of the operation.

Also, in the present specification, description has not been given heretofore of a specific embodiment for providing a program. However, there may be used an embodiment which can provide a program using two-way communication unit such as an internet, or an embodiment which can provide a program by holding it in a recording medium such as a CD-ROM.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image processing apparatus, comprising:
an accepting unit that accepts image information about each of a plurality of image elements to be synthesized;
a comparing unit that compares a threshold value with a mixing ratio used in an operation to synthesize the image information according to the mixing ratio; and
a setting unit that sets, according to a comparison result obtained by the comparing unit, an attribute of an image element in an area where the plurality of image elements are overlapped with each other.

2. The image processing apparatus according to claim 1, further comprising:
a memory unit that stores a threshold value for every attribute of the plurality of image elements,
wherein the comparing unit reads out the threshold value(s) corresponding to an attribute(s) of one or more image element(s) to be synthesized and compares the mixing ratio of the image element with the read-out threshold value of the image element.

3. The image processing apparatus according to claim 1, wherein when a mixing ratio of an upper layer image element of the plurality of image elements synthesized is larger than a threshold value, the setting unit sets an attribute of the upper layer image element as an attribute of the image element in the area.

4. An image forming apparatus, comprising:
an accepting unit that accepts image information about each of a plurality of image elements to be synthesized;
an image processing unit that enforces an image synthesis processing on the image information accepted by the accepting unit; and
an image forming unit that forms a synthesized plurality of image elements on a recording medium, based on the image information which is subjected to the image synthesis processing by the image processing unit,
wherein the image processing unit comprises:
a memory part that stores a threshold value;
a comparing part that compares the threshold value with a mixing ratio used in an operation to synthesize the image information according to a the mixing ratio; and
a setting part that sets, according to a comparison result obtained by the comparing part, an attribute of an image element in an area where the plurality of image elements are overlapped with each other.

5. The image forming apparatus according to claim 4, wherein the memory part stores a threshold value for every attribute of the plurality of image elements, and
the comparing part reads out the threshold value(s) corresponding to an attribute(s) of one or more image element(s) to be synthesized and compares the mixing ratio of the image element with the read-out threshold value of the image element.

6. The image forming apparatus according to claim 4, wherein when a mixing ratio of an upper layer image element of the plurality of image elements synthesized is larger than a threshold value, the image processing unit executes the image synthesis processing in such a manner that the setting part sets an attribute of the upper layer image element as an attribute of the image element in the area.

7. A computer recording medium storing a program causing a computer to execute a process for forming an image, the process comprising:

obtaining image information about each of a plurality of image elements to be synthesized;

comparing a threshold value with a mixing ratio used in an operation to synthesize the image information according to the mixing ratio; and setting, according to a comparison result obtained by comparing the threshold value with the mixing ratio, an attribute of an image element in an area where the plurality of image elements are overlapped with each other.

8. The computer recording medium according to claim 7, wherein the process further comprises:

storing a threshold value for every attribute of the plurality of image elements; and reading out the threshold value(s) corresponding to an attribute(s) of one or more image element(s) to be synthesized and comparing the mixing ratio of the image element with the read-out threshold value of the image element.

9. The computer recording medium according to claim 7, wherein the process further comprises:

when a mixing ratio of an upper layer image element of the plurality of image elements synthesized is larger than a threshold value, setting an attribute of the upper layer image element as an attribute of the image element in the area.

10. An image processing method comprising:

obtaining image information about each of a plurality of image elements to be synthesized;

comparing a threshold value with a mixing ratio used in an operation to synthesize the image information according to the mixing ratio; and setting, according to a comparison result obtained by comparing the threshold value with the mixing ratio, an attribute of an image element in an area where the plurality of image elements are overlapped with each other.

11. The image processing method according to claim 10, wherein the method further comprises:

storing a threshold value for every attribute of the plurality of image elements; and reading out the threshold value(s) corresponding to an attribute(s) of one or more image element(s) to be synthesized and comparing the mixing ratio of the image element with the read-out threshold value of the image element.

12. The image processing method according to claim 10, wherein the method further comprises:

when a mixing ratio of an upper layer image element of the plurality of image elements synthesized is larger than a threshold value, setting an attribute of the upper layer image element as an attribute of the image element in the area.

* * * * *